United States Patent
Malone, III

(10) Patent No.: US 7,519,351 B2
(45) Date of Patent: Apr. 14, 2009

(54) EMERGENCY MODE OPERATION IN A WIRELESS COMMUNICATION NETWORK

(75) Inventor: Bernard L. Malone, III, Little Rock, AR (US)

(73) Assignee: Lucent Technologies Inc., Murray Hill, NJ (US)

( * ) Notice: Subject to any disclaimer, the term of this patent is extended or adjusted under 35 U.S.C. 154(b) by 342 days.

(21) Appl. No.: 10/944,997

(22) Filed: Sep. 20, 2004

(65) Prior Publication Data

US 2006/0009191 A1  Jan. 12, 2006

Related U.S. Application Data

(60) Provisional application No. 60/586,507, filed on Jul. 9, 2004.

(51) Int. Cl.
*H04B 7/15* (2006.01)

(52) U.S. Cl. ............... 455/404.1; 455/521; 379/45

(58) Field of Classification Search .......... 455/404.1, 455/521, 11.1, 414.1, 404.2, 41.2, 522, 567; 379/33, 37, 45, 179, 252, 373.01–3, 374.03
See application file for complete search history.

(56) References Cited

U.S. PATENT DOCUMENTS

| 5,740,532 | A | * | 4/1998 | Fernandez et al. ....... 455/404.1 |
| 5,915,208 | A | * | 6/1999 | Collyer ..................... 455/11.1 |
| 6,038,438 | A | * | 3/2000 | Beeson et al. ............ 455/404.2 |
| 6,115,599 | A | * | 9/2000 | Stilp ........................ 455/404.1 |
| 6,192,232 | B1 | * | 2/2001 | Iseyama ................... 455/404.1 |
| 6,314,281 | B1 | * | 11/2001 | Chao et al. ............... 455/404.2 |
| 6,389,282 | B1 | * | 5/2002 | Hirsch ........................ 455/423 |
| 6,559,753 | B1 | * | 5/2003 | Uchida ..................... 340/7.59 |
| 6,801,762 | B1 | * | 10/2004 | Huilgol .................... 455/404.1 |
| 6,917,680 | B1 | * | 7/2005 | Korn et al. ............. 379/373.01 |
| 7,016,656 | B2 | * | 3/2006 | Odashima et al. .......... 455/74.1 |
| 7,127,260 | B1 | * | 10/2006 | Kim et al. ................ 455/456.4 |
| 2005/0037728 | A1 | * | 2/2005 | Binzel et al. ............. 455/404.1 |
| 2005/0048978 | A1 | * | 3/2005 | Santhoff et al. ............. 455/442 |
| 2005/0181726 | A1 | * | 8/2005 | Gottlieb et al. ............ 455/41.2 |
| 2006/0078105 | A1 | * | 4/2006 | Korn et al. ............. 379/210.02 |
| 2006/0178128 | A1 | * | 8/2006 | Eaton et al. .............. 455/404.1 |
| 2007/0010276 | A1 | * | 1/2007 | Kanada et al. .............. 455/522 |

OTHER PUBLICATIONS

Wireless Emergency Response Team (WERT) Final Report for the Sep. 11, 2001 New York City World Trade Center Terrorist Attack, dated Oct. 2001.

* cited by examiner

Primary Examiner—CongVan Tran

(57) ABSTRACT

A wireless communication network 20 operates in an emergency mode 22. In one example, network components enter an emergency mode 24. In another example, mobile stations enter an emergency mode 26. Various disclosed emergency mode features such as having a dedicated emergency channel, using dedicated emergency devices, using mobile stations as repeaters, providing alive user indications and utilizing beacon signals can be combined in different ways to facilitate search and rescue operations, for example.

8 Claims, 2 Drawing Sheets

EMERGENCY MODE OPERATION IN A WIRELESS COMMUNICATION NETWORK

CROSS REFERENCE TO RELATED APPLICATIONS

This application claims priority to U.S. Provisional Application No. 60/586,507 which was filed on Jul. 9, 2004.

FIELD OF THE INVENTION

This invention generally relates to telecommunications. More particularly, this invention relates to wireless communication systems.

DESCRIPTION OF THE RELATED ART

Wireless communication systems are well known. Geographic regions are divided into cells or sectors that are served by base station transceivers. Mobile stations, such as cellular phones, communicate with a base station when the mobile station is within the corresponding cell, for example. As the mobile station moves between cells, the various base stations communicate signals to and from the mobile stations.

Mobile switching centers operate in a known manner for allowing the mobile station communications to be received by another mobile station or a line-based telephone, for example.

In addition to voice communications, a variety of data capabilities have been developed along with video and other capabilities. Wireless communications have grown significantly in that enhanced capabilities are available to a larger number of people.

Under most circumstances, known wireless communication networks serve their intended purposes. There are occasions where a wireless communication network would be useful but the normal communication techniques render the network less than optimal for addressing such situations. For example, a disaster or emergency situation may be handled using wireless communications to minimize the damage or effects of such a situation.

Consider the attack on the World Trade Center in New York City, for example. There were significant efforts to search for and rescue individuals trapped in the rubble who may have had a cell phone or other wireless communication device. The limitations on traditional wireless communication networks prevent or degrade any use of wireless communication devices for such situations. For example, the debris associated with the collapse of the World Trade Center made it impossible for adequate signal transmission between base station transceivers and mobile stations within the rubble. Additionally, much of the network infrastructure in the vicinity of the World Trade Center was damaged and, therefore, not effective. Further, the additional load on the system from the large number of individuals attempting to contact others using wireless communications taxed system resources, which made them less available for targeted search and rescue efforts.

There is a need for enhancing wireless communication systems to address communications with or search and rescue of individuals using wireless communication devices in emergency or disaster situations. This invention includes a number of techniques that satisfy that need.

SUMMARY OF THE INVENTION

A disclosed example method of communicating includes changing between a normal operating mode and an emergency mode under selected circumstances.

The term "emergency mode" as used in this document is a mode of operation that includes at least one function or feature that is not performed or used during a normal telecommunication operating mode (i.e., voice communications, data communications, video communications or a combination of those using at least one mobile station).

An example emergency mode includes at least one of: using a dedicated emergency channel; using dedicated emergency devices such as a portable base station transceiver, a search and rescue repeater or a satellite in orbit about the earth that is tuned for radio frequency signal communication; communicating with a variety of beacon devices, such as mobile stations or other signaling devices that do not normally communicate with a wireless telecommunication network; expanding the operating parameters of the network to recognize emergency devices such as the dedicated emergency devices or beacons; operating a base station or mobile switching center using software that is independent of the software used for normal telecommunication mode; supporting search and rescue operations; using a mobile station as a repeater for another mobile station; using a mobile station to "listen" for other mobile stations, storing information about such other mobile stations and providing such information to another portion of a network to provide enhanced location capacity especially when debris, for example, interferes with the signal from a "heard" mobile station so that it cannot be detected by a base station transceiver or some other device; providing mobile station position information on a current or recent basis with a time stamp; operating a mobile station in the emergency mode on a first channel and operating the mobile station in the normal wireless telecommunication mode on a second channel; recognizing use of a mobile station user interface as an indication that a live user has the mobile station; and providing two way emergency short message service using mobile stations.

In one example, a mobile switching center of a wireless network changes to operate in an emergency mode. It is possible to have any number of network elements operating in an emergency mode. In another example, mobile stations individually change into an emergency mode of operation. In one example, the mobile stations switch into an emergency mode responsive to a network-based change into the emergency mode. In another example, mobile stations have individualized capability of switching into an emergency mode prior to a network-based change.

In one example, a dedicated emergency mode channel is used for communications when operating in the emergency mode.

Another example includes using portable devices that operate similar to or in place of more permanent network communication devices such as base station transceivers.

The various features and advantages of this invention will become apparent to those skilled in the art from the following detailed description. The drawings that accompany the detailed description can be briefly described as follows.

DETAILED DESCRIPTION

Figure 1:
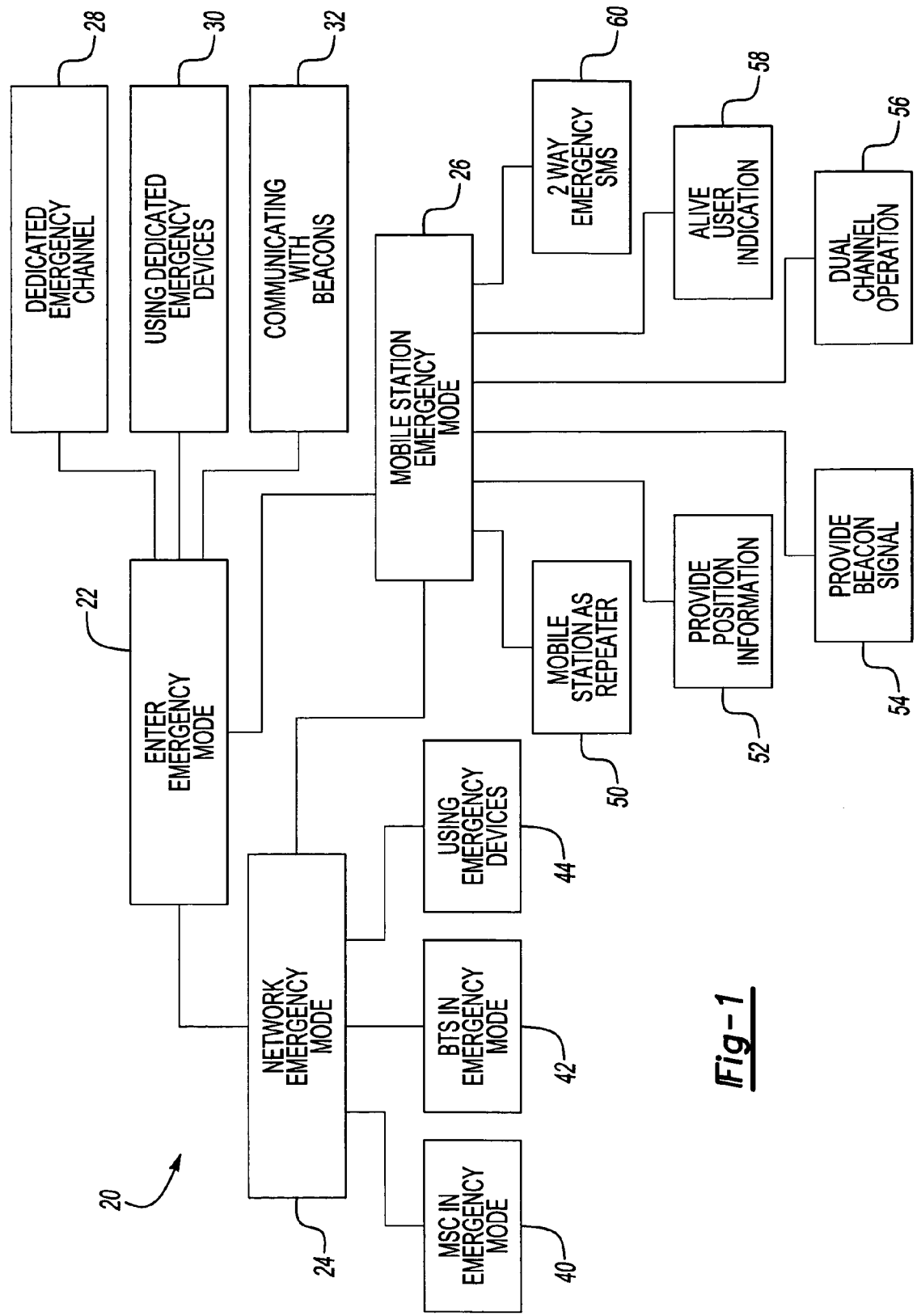
FIG. 1 schematically illustrates a wireless communication network operating in an emergency mode.

FIG. 1 schematically shows a wireless communication network 20 that is capable of operating in a normal operating mode for most situations and in an emergency operating mode under selected circumstances. When disaster or emergency conditions occur, at least portions of the network 20 enter into an emergency mode at 22. Entering the emergency mode may occur at a network level at 24 or at a mobile station level at 26.

Controlling when to enter the emergency mode occurs in one example based upon manual user input to an appropriate network device or a mobile station. In another example, the wireless communication device or devices that enter the emergency mode are capable of automatically entering the emergency mode. Given this description, those skilled in the art will be able to develop an appropriate manner for entering an emergency operating mode to meet the needs of their particular situation and to accommodate the particular technologies of the wireless network with which they are dealing.

As schematically shown in FIG. 1, entering the emergency mode may include one or a plurality of operating features. A variety of such features are discussed in this description and it should be appreciated that each of them may be utilized individually or in combinations with one or more others to meet the needs of a particular situation.

For example, entering the emergency mode at 22 includes using a dedicated emergency channel 28. Dedicating at least one channel for emergency mode operation allows for having a clear channel to conduct search and rescue operations that will not be compromised because of other wireless communication uses. In one example, a dedicated channel is defined for search and rescue purposes in each cellular and PCS band that has been authorized for use by a particular wireless service, and which is not used for regular wireless communication traffic. The dedicated channel in one example is within the normal operating abilities of commercial wireless equipment. In one example, a government organization such as the Federal Communications Commission in the United States will control which channels are dedicated for emergency operations.

The dedicated emergency channel 28 may have a variety of uses for one or more of the example features discussed below.

Another example feature of the emergency mode of FIG. 1 includes using dedicated emergency devices 30. One example dedicated emergency device is a portable base station transceiver. Such a device may take various forms. In one example, a portable base station transceiver includes enough network functions for the transceiver to operate independent of other network base station transceivers. Such a device may be useful, for example, when the infrastructure of a wireless communication network has become damaged because of a disaster or emergency situation.

One example portable base station transceiver includes the capabilities of conducting calls between mobile stations and registering mobile stations that communicate with the portable base station transceiver. One example portable base station transceiver includes some functions of a mobile switching center such as changing some mobile-dependent translations. This example includes the ability to accommodate a two-way conversation between different mobile stations without requiring any connection to another part of a wireless network.

Another example portable base station transceiver is dedicated to search and rescue operations. This example device has the specific operating band and mode that makes it suitable for use in emergency, search and rescue environments. In a situation where there is a dedicated emergency channel 28, such a base station transceiver may be suitably designed for operating on such a channel or could be switched between normal communication channels and the dedicated emergency channel.

An example portable base station transceiver is low-weight enough to be readily transported to appropriate locations while still being rugged enough to be stand-alone, self-powered and functionally equivalent to a traditional base station transceiver. Some examples include remote-controlled operation so that authorized individuals can coordinate efforts using a plurality of strategically located portable base station transceivers.

Another example dedicated emergency device 30 is a search and rescue repeater. An example repeater is portable, low-weight, self-powered and is capable of stand-alone or remote controlled operation. One feature of an example search and rescue repeater is that it is designed to withstand harsh environments. One example repeater is equipped for a specific operating band, such as a dedicated emergency channel 28. One function of such a repeater is to search for and obtain mobile station signals and then to repeat those signals to transmit them to a base station transceiver to effectively extend the range of mobile station and base station signals, for example, so that appropriate search and rescue action can be taken.

Another example dedicated emergency device 30 includes a satellite in orbit about the earth that is tuned for radio frequency signal communication using frequencies that are dedicated for emergency operating modes. Having dedicated satellites of this type extends search and rescue emergency coverage to large geographic areas that may not normally have radio coverage. An example search and rescue satellite has the capacity to effectively listen for emergency signals from mobile stations. In one example, the satellite includes a controller that detects calls to the emergency number 911 or monitors text messages that include emergency information. Further, one example satellite includes the capacity of detecting beacon signals that are transmitted during emergency operating mode.

Mobile stations may transmit beacon signals. The emergency mode of the example of FIG. 1 includes communicating with a variety of beacon devices at 32. Examples include key fobs and other wireless signal transmitting devices that normally do not have any communication connection with a wireless communication network. In the emergency operating mode, the network has one or more devices that are capable of receiving or detecting beacon signals from such beacon devices during the emergency operating mode. For example, a key fob may be used by an individual trapped beneath debris. If the signal transmission is sufficiently strong, an appropriate detector, such as one of the example search and rescue repeaters described above, captures such a beacon signal, that can be relayed so that appropriate action may be taken to investigate whether the signal possibly indicates the location of an individual requiring assistance.

The various features shown at 28, 30 and 32 in FIG. 1 are used in some examples during a network emergency mode at 24, a mobile station emergency mode at 26 or both.

The example network emergency mode at 24 includes operating at least one network device in the emergency mode. A mobile switching center is placed into the emergency mode at 40 automatically or responsive to manual input, for example. In one example, the entire mobile switching center enters the emergency mode. In another example, emergency mode is limited to particular base stations dedicated to that mobile switching center. Manual instigation of the emergency mode for a mobile switching center is used in one example. An authorized system manager can switch the mobile switching center into emergency mode. That individual may have the capability of controlling the behavior of at least selected base stations and the mobile switching center.

In one example, a mobile switching center operating in the emergency mode is aware of other mobile switching centers operating in the emergency mode. A mobile switching center that enters the emergency mode may operate in a manner to support a variety of emergency communications for supporting search and rescue operations, for example.

At least one base station transceiver operates in the emergency mode at 42. A particular base station transceiver may enter the emergency mode independent of the mobile switching center at 40 or responsive to the mobile switching center at 40, depending on the needs of a particular situation.

As schematically shown at 44, when the network is operating in the emergency mode, emergency devices such as the dedicated emergency devices or beacons discussed above are recognized as part of the communication network during the emergency operating mode. Expanding the network in this manner enhances search and rescue capabilities, for example. Using a wireless network in an emergency mode to provide communication with devices normally outside of the network maximizes the usefulness of the network infrastructure.

In one example, the mobile switching center at 40 or the base station at 42 includes software that operates in the emergency mode. In one example, this software is independent of the normal operating software. In another example, the emergency operating software is at least part of the normal operating software.

The emergency operating software controls specific behaviors of the mobile switching center and at least selected base stations for two-way communication, signal detection, radio location and other search and rescue efforts, for example. Supporting search and rescue operations in one example includes power control, mobile station registrations, beacon transmissions and receptions, short message service transmissions, instructions for operating on dedicated or clear channels and other techniques from this description.

When operating in the emergency mode using a mobile station in emergency mode at 26, a variety of features may be included in such a mobile station according to the example embodiment of FIG. 1. One feature shown at 50 is using the mobile station as a repeater. In this example, at least one mobile station acts as a repeater for another mobile station. A repeater function may be incorporated into all or at least some mobile stations.

A first mobile station may hear a beacon signal or another communication signal from a nearby mobile station. The nearby mobile station may not be in a position where it is possible for that mobile station to communicate with other portions of the wireless network. The first mobile station, however, may be in a position to do so. The first mobile station receives a signal from the other mobile station and transmits a signal indicating at least that the other mobile station has been heard by the first mobile station.

In one example, the first, repeating mobile station operates in a delayed mode where the repeating mobile station records or saves information about other mobile stations recently heard. A mobile-stations-heard list is used in one example. A repeating mobile station transmits a signal indicating all information stored within the mobile-stations-heard list. In one example, that listing includes an indication of the telephone number and a time stamp regarding when the other mobile station was heard. The repeating mobile station may be periodically interrogated by the network or rescuers using search and rescue equipment, for example, and responsively provides the information regarding the other mobile stations.

In one example, when the repeating mobile station is in the emergency operating mode, the other mobile stations need not be in an emergency operating mode.

An example repeating mobile station receives signals from other mobile stations at the frequency on which the repeating mobile station normally transmits during the normal operating mode. The same repeating mobile station transmits a signal including at least an indication of another mobile station using the frequency at which it normally receives signals. In this example, the frequencies for transmitting and receiving used by the repeating mobile station during normal operating mode are effectively reversed when the repeating mobile station operates in the emergency mode. Whether frequencies are switched will depend on the particular technology (CDMA, TDMA, etc.) and the actual techniques for making a mobile station an effective repeating mobile station will vary.

Using mobile stations to "listen" for other mobile stations, storing information about such other mobile stations and providing such information to another portion of a network provides enhanced location capacity especially when debris, for example, interferes with the signal from a "heard" mobile station so that it cannot be detected by a base station transceiver or some other device.

Another feature shown in FIG. 1 is providing position information at 52. A mobile station that has global positioning system capability provides location data during the emergency operating mode. This information may be used, for example, to determine a current or last known position of a mobile station.

In one example, a mobile station has a memory log that records recent position data. This data may include global positioning system location coordinates or cell information along with a time-stamp. The mobile station transmits such last-known-position information to the network or rescuers in response to an interrogation signal, for example. Alternatively, the position information may be part of an automatically transmitted beacon signal when the mobile station operates in the emergency mode.

Another feature shown in FIG. 1 is providing a beacon signal at 54. In one example, an emergency locator beacon signal is transmitted by a mobile station upon entry into the emergency mode. The beacon signal may be transmitted on a periodic basis in an automated mode. In another example, manual activation of a portion of a keypad on a mobile station causes transmission of a beacon signal. In one example, the beacon signal includes location information like that discussed above. A beacon signal in one example is transmitted on the dedicated emergency channel or channels, depending on the particular system configuration. In another example, a beacon signal transmission is on a separate frequency dedicated purely to beacon signal transmissions.

Another feature of the mobile station emergency mode operation in the example of FIG. 1 is dual channel operation at 56. In this example, a mobile station has the capacity to operate in the emergency mode on a first channel and operate in normal wireless communication mode on a second channel. Such an example provides an individual the ability, for example, to carry on an intended conversation while the mobile station also operates in the emergency mode.

Another feature is shown at 58 and includes providing an indication that a mobile station user is alive. In this example, the mobile station includes a user interface such as a numeric keypad. The mobile station is provided with the capacity to record or recognize activity of an individual using the interface. A monitoring function allows for recording human user interface activity along with a time stamp in one example.

Recognizing human use of the user interface includes the ability to distinguish between actual human interaction and accidental operation of the device such as an object pressing upon one or more keypad buttons in a continuous manner. Recognizing sequences or patterns of keypad activation, for example, provides an indication that a human user is attempting to use the mobile station. Such information is saved as an alive user indication and may be transmitted to a network, search and rescue workers or to a repeating mobile station, depending on the particular situation. The alive user indication may include position information, timing information regarding the last recognition of such use, an indication of a frequency of such use, an indication of the type of use or a combination of two or more of these.

Another feature shown at 60 is providing two way emergency short message service using mobile stations operating in emergency mode. In one example, when a mobile station receives an emergency notification or interrogation from an appropriate portion of the network, the mobile station responds with an automated short message service reply. The automated reply in one example contains important information about that mobile station such as position information or an alive user indication, for example. In examples where mobile stations operate as repeaters in the emergency mode, the short message service reply may also include information that the mobile station has collected from other mobile stations. Other information that may be included in a short message service reply includes a call log or list, time-stamp information regarding recent use of the mobile station and information regarding the features that the particular mobile station has for purposes of operating in emergency mode.

Figure 2:
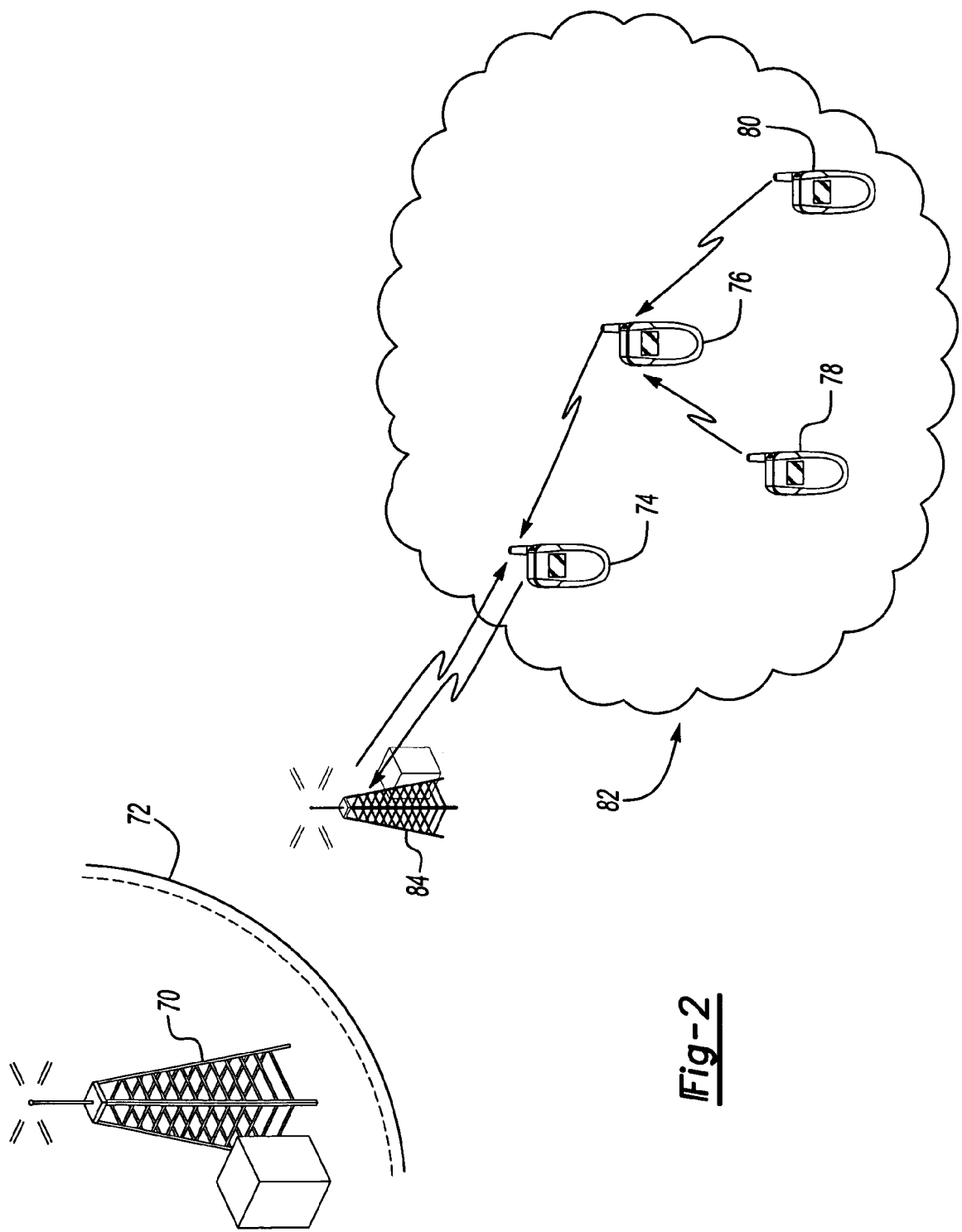
FIG. 2 schematically illustrates selected features of the embodiment of FIG. 1 in one example scenario.

FIG. 2 schematically illustrates one example situation where a base station transceiver 70 is a normal network operating component. A communication range 72 for the base station transceiver is schematically shown in FIG. 2. The communication range 72 may be the normal operating range or may be hampered because of some alteration in the network caused by a disaster or emergency situation.

In this example a plurality of mobile stations 74, 76, 78 and 80 are located outside of the communication range 72 of the base station transceiver 70. In this example, the mobile stations 74-80 are located beneath debris 82 such that the individuals possessing the mobile stations require emergency assistance. In this example, the mobile stations operate in emergency mode.

As can be appreciated from FIG. 2, the mobile station 76 is within a range of being capable of communicating with the mobile stations 78 and 80. In this example, at least the mobile stations 78 and 80 provide a beacon signal as described above. The mobile station 76 acts as a repeater mobile station because it receives the beacon signals from the mobile stations 78 and 80. The mobile station 74 is capable of communicating with the mobile station 76 but not the mobile station 78, for example. This may occur because of the relative locations of the mobile stations or the presence of objects between them that would interfere with direct communication between the mobile stations 74 and 78, for example.

In this example, the information gathered by the mobile station 76 regarding the mobile stations 78 and 80 is provided to the mobile station 74. At this point the mobile station 74 has information regarding the mobile station 76 and the information from the mobile station 76 regarding the mobile stations 78 and 80. In this example, the mobile station 74 has last known position information as described above, and an alive user indication from each of the mobile stations, provided that such an indication is appropriate.

Also shown in the example of FIG. 2 is a portable base station transceiver 84 that is used for search and rescue purposes. In this example, the base station transceiver 84 is in a position where it is possible to communicate with the mobile station 74. Accordingly, the base station transceiver 84 can receive information from the mobile station 74 with all of the available information regarding the mobile stations 74, 76, 78 and 80.

In one example, the base station transceiver 84 operates independent of other network components to facilitate search and rescue operations or communications between the mobile station 74 and other mobile stations, for example. In another example, the base station transceiver 84 communicates with the base station transceiver 70 to provide information to facilitate providing emergency help to the individuals that have the mobile stations 74-80.

The example of FIG. 2 shows one example of how the various features of the described example can be combined and configured in an emergency operating mode. Other combinations and variations are possible. Using a wireless communication network in an emergency mode of operation provides enhanced capabilities for using wireless communication devices for enhanced search and rescue operations or otherwise providing emergency help or relief in a wider variety of circumstances.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of communicating comprising:
    changing, under selected circumstances, between a normal telecommunication operating mode and an emergency mode that includes at least one function that is separate from the normal telecommunication operating mode;
    using a portable base transceiver station that is capable of independent emergency mode communication with at least one mobile station to perform at least a selected function normally performed by a mobile switching center to facilitate communication between at least two different mobile stations without requiring any connection or link to another part of a wireless network.

2. A method of communicating comprising:
    changing, under selected circumstances, between a normal telecommunication operating mode and an emergency mode that includes at least one function that is separate from the normal telecommunication operating mode;
    operating a first mobile station in the emergency mode;
    using the first mobile station as a repeater of other mobile station communications;
    determining whether another mobile station can be heard by the first mobile station operating in the emergency mode;
    storing at least an indication of a heard mobile station;
    storing at least one other piece of information regarding the heard mobile station; and
    transmitting a signal indicating at least the stored indication of the heard mobile station and the other piece of information regarding the heard mobile station.

3. The method of claim 2, wherein the at least one other piece of information comprises at least one of a time stamp regarding a most recent time that the first mobile station detected the heard mobile station or an indication of a type of transmission from the heard mobile station detected by the first mobile station.

4. A method of communicating comprising:
changing, under selected circumstances, between a normal telecommunication operating mode and an emergency mode that includes at least one function that is separate from the normal telecommunication operating mode, wherein a dedicated emergency channel is exclusively used only in the emergency mode, and wherein the dedicated emergency channel is not used for regular wireless communication traffic;
operating a mobile station in the emergency mode; and
transmitting an emergency beacon signal from the mobile station only during the emergency mode that includes at least an indication of a location of the mobile station.

5. The method of claim 4, wherein the dedicated channel is used by mobile stations exclusively for transmitting the emergency beacon signal during the emergency mode.

6. The method of claim 4, wherein the indication of the mobile station location comprises at least one of global positioning system coordinates or cell information.

7. A method of communicating comprising:
changing, under selected circumstances, between a normal telecommunication operating mode and an emergency mode that includes at least one type of emergency communication that is separate from a voice communication as used in the normal telecommunication operating mode and
conducting the at least one type of emergency communication using a channel that is dedicated exclusively for use only in the emergency mode,
operating a mobile station in the emergency mode using the dedicated channel; and
simultaneously operating the mobile station using a second channel for conducting a communication that is associated with the normal telecommunication operating mode.

8. A method of communicating comprising:
changing, under selected circumstances, between a normal telecommunication operating mode and an emergency mode that includes at least one type of emergency communication that is separate from a voice communication as used in the normal telecommunication operating mode and
conducting the at least one type of emergency communication using a channel that is dedicated exclusively for use only in the emergency mode,
communicating with a first plurality of devices during the normal telecommunication operating mode; and
communicating in the emergency mode with at least a second plurality of devices not capable of communicating in the normal telecommunication operating mode.

* * * * *